(12) United States Patent
Berger et al.

(10) Patent No.: US 7,582,019 B2
(45) Date of Patent: Sep. 1, 2009

(54) SECURITY COUPLING IN PARTICULAR FOR MAIN DRIVETRAINS ON ROLLING STANDS

(75) Inventors: Maik Berger, Chemnitz (DE); Achim Klein, Kreuztal (DE); Jörn Sohler, Kreuztal (DE); Michael Saupe, Siegen (DE)

(73) Assignee: SMS Demag AG, Düsseldorf (DE)

( * ) Notice: Subject to any disclaimer, the term of this patent is extended or adjusted under 35 U.S.C. 154(b) by 292 days.

(21) Appl. No.: 10/582,276

(22) PCT Filed: Nov. 11, 2004

(86) PCT No.: PCT/EP2004/012780

§ 371 (c)(1),
(2), (4) Date: Jun. 10, 2006

(87) PCT Pub. No.: WO2005/057038

PCT Pub. Date: Jun. 23, 2005

(65) Prior Publication Data

US 2007/0140781 A1  Jun. 21, 2007

(30) Foreign Application Priority Data

Dec. 13, 2003  (DE) .............................. 103 58 435

(51) Int. Cl.
*F16D 3/80*  (2006.01)

(52) U.S. Cl. .............................. 464/27; 464/28; 464/32
(58) Field of Classification Search .................. 464/27, 464/28, 30–32, 163, 165; 492/15, 16
See application file for complete search history.

(56) References Cited

U.S. PATENT DOCUMENTS 5,141,350 A * 8/1992 Hecke .................. 464/32 X

FOREIGN PATENT DOCUMENTS

| DE | 41 12 484 | 10/1992 |
|----|-----------|---------|
| DE | 43 26 868 | 4/1995 |
| DE | 195 37 249 | 4/1997 |

\* cited by examiner

*Primary Examiner*—Greg Binda
(74) *Attorney, Agent, or Firm*—Friedrich Kueffner

(57) ABSTRACT

An overload safety coupling, especially for the main drivetrains on rolling stands, which bridges a toothed spindle section and a spindle section with a permanent seat. The coupling includes a rotating-and-sliding sleeve, which has internal toothing at one end to hold the spindle section in a way that allows axial displacement. At the other end, the sleeve holds an inner sleeve, which is permanently seated on the spindle section. A pressure sleeve and a pressure gap pretensioned with pressure fluid produce a nonrotatable connection between the rear sleeve-like extension and the inner sleeve, which frictional connection gives way in the event of an overload.

9 Claims, 1 Drawing Sheet

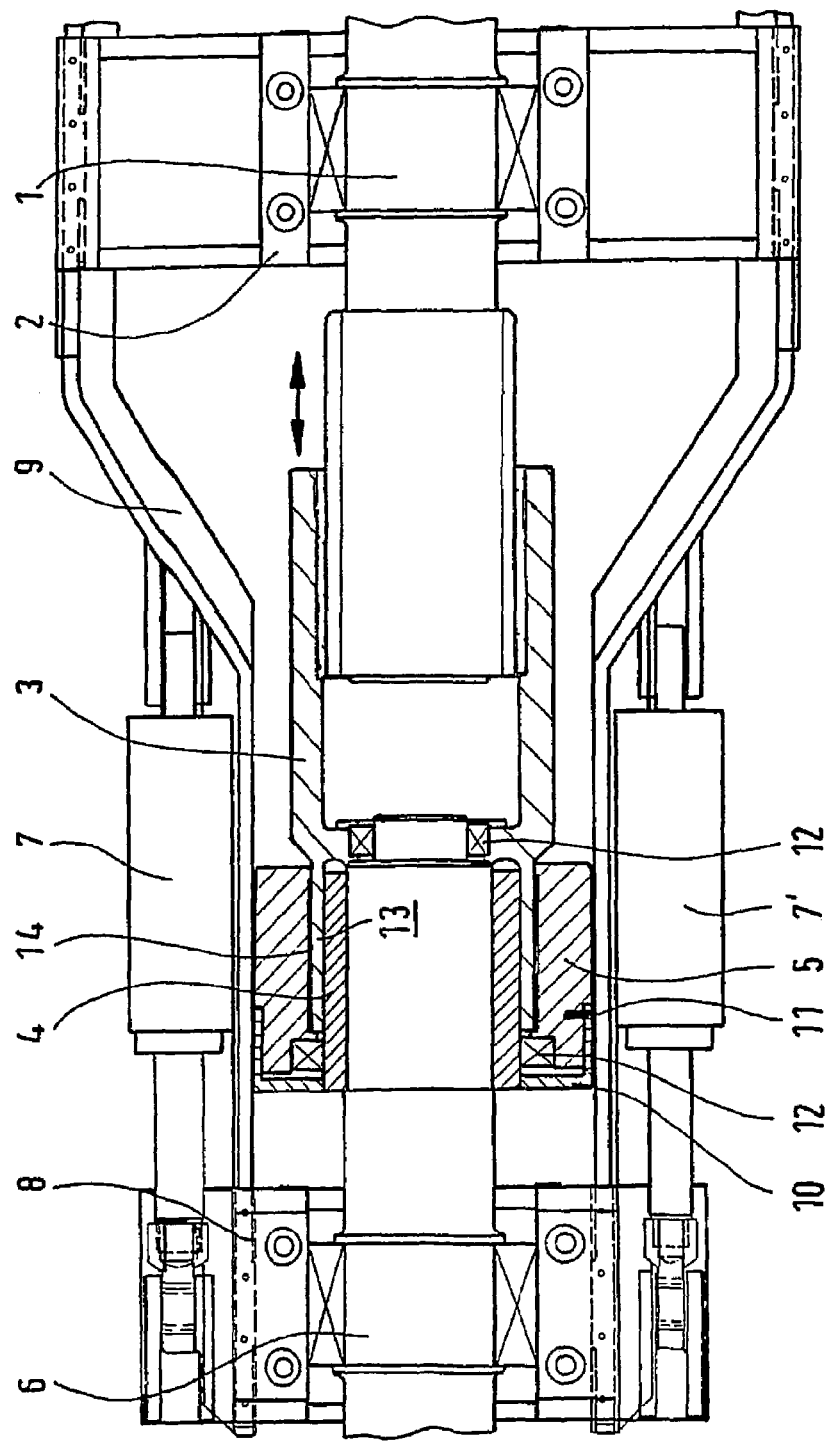

SECURITY COUPLING IN PARTICULAR FOR MAIN DRIVETRAINS ON ROLLING STANDS

BACKGROUND OF THE INVENTION

The invention concerns an overload safety coupling, especially for main drivetrains on rolling stands, which bridges a toothed section of the spindle and a spindle section with a permanent seat.

In modern plate rolling stands, it is now often customary to install a torsional safety coupling on the motor side, outside the axially movable drive shafts, for protection against overloads caused by torques.

In universal-joint shafts, the safety function against axial overloads caused, for example, by oblique fractures of the roll is obtained by the use of a sliding piece. Such sliding pieces also serve the purpose of equalizing the lengths of the rolls when they are being actively shifted.

In contrast to universal-joint shafts, flat-neck spindles generally cannot be moved axially. In flat-neck drives, a small amount of axial displacement is realized between the wobbler on the roll side and the joint head. To provide for greater axial displacement of the rolls or as a safety function in the event of a collision, in a few cases the joint head is designed with the ability to shift on a splined shaft.

Document DE 38 11 790 A1 discloses, for example, a rolling mill drive with an articulated spindle with curved toothing. In the case of the axially shiftable articulated spindles arranged between the pinion and work rolls, the spindle joint consists of a coupling wobbler with curved toothing and a coupling sleeve with internal toothing that surrounds this wobbler. The coupling sleves are pushed onto the shaft necks of the pinion and work roll. The articulated spindle is guided between the coupling sleeves by means of support elements arranged in the region of the shaft axis and by means of axially adjustable plungers. To compensate the axial displacement of the work roll connected to the articulated spindle, the internal toothing of the coupling sleeve extends beyond the curved toothing of the wobbler with a least a supporting length, which corresponds to the length of the possible axial displacement of the articulated shafts.

Document DE 37 06 577 C2 discloses a toothed articulated spindle for rolling mill drives with coupling wobblers that have curved toothing and are located on the ends of the spindle shaft, with internal toothings of the connecting sleeves, which are supported on the spindle shaft at both ends by support balls and pressure rams, such that the internal toothings surround the coupling wobblers, and with a circulating oil lubrication system, which includes an oil feed ring furnished with a groove. The oil feed ring surrounds and is sealed from the spindle shaft, on which it is rotatably supported and secured against axial displacement. The groove is connected by at least one radial bore in the spindle shaft to at least one longitudinal central channel, from which the gear couplings, which are to be lubricated and cooled, can be supplied with oil. The bore of the central channel has an enlarged diameter in the end region of the spindle shaft on the roll side for receiving pressure plungers pretensioned by disk springs. At least one oil drainage housing supported on the spindle shaft surrounds and is sealed from the gear coupling and the oil feed ring. The spindle shaft is supported in at least one of the coupling wobblers in such a way that it can be axially displaced but cannot rotate and is guided in an axially displaceable way on an axially pretensioned guide bush that has the supporting balls. The central channel is furnished with bores and oil lines for circulating oil lubrication of the frictional contact surfaces between the coupling wobbler that can be axially shifted relative to the spindle shaft, the guide bush that can be axially shifted relative to the spindle shaft, the supporting balls that can be displaced relative to the pressure ram, and the curved toothings that can be displaced relative to the internal toothings.

Document DE 40 28 158 A1 discloses a coupling for coupling two coaxial parts that can rotate relative to each other, which comprises a substantially cylindrical coupling member, which is intended to be mounted between the parts to be coupled and is expandable both radially outwards and radially inwards so as to exert on the parts a coupling pressure by the interposition of the coupling member. The coupling member contains a pressure chamber, which is intended to be supplied with pressure fluid for expansion of the coupling member and is provided with a pressure relief device, which is triggered upon relative rotation of the aforementioned parts. The coupling member is designed in such a way that it exerts a greater coupling force on a first of the aforementioned parts than on the other part, and the pressure relief device is designed in such a way that it is activated upon relative rotation between the first part and the coupling member but permits rotation between the other part and the coupling member.

Document DE 34 19 307 A1 discloses an arrangement for a releasable frictional connection between a gearbox input shaft, which is designed as a hollow shaft and is supported in spaced bearings inside a housing, and a drive shaft which can be inserted into the aforementioned shaft. An annular chamber of small radial width, which is filled with fluid and ends before the bearings, is formed in the gearbox input shaft. At at least one end of the gearbox input shaft, a device that communicates with the annular chamber is provided to exert pressure on the fluid and thus to clamp the gearbox input shaft on the drive shaft.

Document EP 0 429 468 B1 discloses a torque-limiting coupling arrangement with two coaxial coupling members, which are nonrotatably connected with a drive shaft and a driven shaft and engage each other by means of two opposing pressurized surfaces to form a friction joint. The friction joint is dimensioned in such a way that it slips when the torque acting on the coupling exceeds a predetermined value. A device is provided which detects the occurrence of slip in the friction joint and disengages the coupling when slip occurs. The friction joint has a cylindrical part which is rigidly joined with one coupling member and supports a press-fit cylindrical bush and which is rigidly joined with the other coupling member. The coupling arrangement also has a high-pressure pump, which is driven by the detector device in such a way that it delivers pressurized medium to an outlet channel when slipping occurs in the friction joint. A plurality of openings is formed on at least one of the frictional contact surfaces. The openings communicate with the outlet channel of the pump. The openings are formed in such a way that they form a hydrostatic layer together with the frictional surfaces when pressure medium is supplied.

Document DE 101 12 088 A1 concerns a method for building up pressure in couplings for the nonpositive connection of two coaxial machine elements that are to be coupled without play—a first machine element on the input end and a second machine element on the output end—with a cavity that is bounded by at least one partly elastically deformable wall and can be filled with a pressure medium. During the rotation of the coupling, the pressure medium is delivered from a corotating pressure medium tank to the cavity by at least one delivery device arranged in the region of the outer periphery of the coupling, wherein the drive is formed by an eccentric, which acts on the delivery device directly or indirectly via additional transmission means.

SUMMARY OF THE INVENTION

Taking the prior art described above as a point of departure, the objective of the invention is to find a solution, especially for flat-neck drives with two bearings for balancing the spindle, which would make it possible to integrate a combined system for preventing torsional and axial displacement overloads, preferably in existing drives.

To achieve this objective in an overload safety coupling, especially for main drivetrains on rolling stands, which coupling bridges a toothed section of the spindle and a spindle section with a permanent seat, a rotating-and-sliding sleeve is proposed, one end of which has internal toothing to hold the spindle section in a way that allows axial displacement, whereas the other end has an inner sleeve which is permanently seated on the spindle section with a permanent seat. By means of a pressure sleeve and a fluid-pressurized gap, a rear sleeve-like extension is frictionally connected in nonrotatable fashion, which yields in the event of an overload. These measures make it possible to combine a mechanism which protects against axial overload with an antirotation device which protects against torsional overload.

In a refinement of the safety coupling, it is proposed that, to absorb the axial coupling forces, external axial pressure cylinders, which are designed to yield in the event of overload, are preferably arranged as spacers between the spindle sections.

Further refinements of the invention are specified in the dependent claims.

It can be provided that one of the spindle sections is designed with a fixed bearing, while the other spindle section is designed with a movable bearing.

In addition, it can be provided that, in the event of an axial overload acting on the spindle section in the direction toward the side where the fixed bearing is installed, this spindle section, along with the movable bearing, the antirotation device, and the internally toothed rotating-and-sliding sleeve, is able to slide over the externally toothed part of this spindle section.

Furthermore, it is advantageous for the force which initiates the axial displacement to be set by adjusting the pressure in the cylinders. It is also advantageous for the cylinders to be designed to control or damp the coupling action.

In an effective refinement, the spindle section with the permanently connected sleeve is designed to slip relative to the rotating-and-sliding sleeve and the pressure sleeve in the event of a torque overload. A shear collar, which is rigidly connected to this section, is also connected to a shear valve, as a result of which the connection pretensioned by the pressure medium in the pressure gap is released. After the connection is released, rotation proceeds by way of a bearing, the release torque having been set by adjusting the pressure at the pressure sleeve.

Further details, features, and advantages of the invention are described in the following explanation of the specific embodiment, which is schematically illustrated in the drawing.

BRIEF DESCRIPTION OF THE DRAWING

FIG. 1 shows a combined torsional and axial displacement safety coupling, especially for the main drivetrains on rolling stands, which bridges a toothed spindle section and a spindle section with a permanent seat.

DETAILED DESCRIPTION OF THE INVENTION

The safety coupling of the invention is designed with a rotating-and-sliding sleeve 3, one end of which has internal toothing to hold the spindle section 1 in a way that allows axial displacement, whereas, at the other end, it holds an inner sleeve 4, which is permanently seated on the spindle section 6, the inner sleeve in turn being frictionally connected nonrotatably to the rear sleeve-like extension 13 of the rotating-and-sliding sleeve 3 by the action of a pressure sleeve 5 and a fluid-pressurized gap 14 between the rear sleeve-like extension 13 and the pressure sleeve. This nonrotatable frictional connection gives way in the event of an overload. To absorb the axial coupling forces, external axial pressure cylinders 7, 7', which are designed to yield in the event of overload, are preferably provided as spacers between the spindle sections 1 and 6.

The spindle section 1 is designed with a fixed bearing 2, and the spindle section 6 is designed with a movable bearing 8. In the event of an axial overload on the spindle section 6 acting toward the side where the fixed bearing 2 is installed, the spindle shaft section 6, along with the movable bearing 8, the antirotation device 4, 5, and the internally toothed rotating-and-sliding sleeve 3, is able to slide over the externally toothed part of the spindle section 1. The initiating force of this axial displacement can be set by adjusting the pressure in the cylinders 7, 7'. The cylinders 7, 7' can thus be used to control or damp the coupling action.

In the event of a torque overload, the section 6 with the permanently seated sleeve 4 slips relative to the rotating-and-sliding sleeve 3 and the pressure sleeve 5, and a shear collar 10, permanently connected to the section 6, shears off the head of the shear valve 11, so that the connection pretensioned by the pressure medium in the pressure gap 14 is released, and after the release, rotation occurs via the bearing 12, the initiating torque having been set by adjustment of the pressure at the pressure sleeve.

The operation of the safety coupling of the invention can be described as follows:

The spindle section 1 with the external toothing is axially and radially supported by the fixed bearing 2. It transmits the necessary torque to the roll by way of a positive connection with the rotating-and-sliding sleeve 3. There is a frictional connection between the untoothed end of the rotating-and-sliding sleeve 3 and the pressure sleeve 5 of the antirotation device. This frictional connection is maintained by a pressure medium present in a gap of the pressure sleeve 5. The inner sleeve 4 is permanently seated on the spindle section 6. The axial mobility of the toothing between shaft section 1 and the rotating-and-sliding sleeve 3 is limited by at least one cylinder 7, 7'.

In the event, for example, of an oblique fracture in the roll, in order to protect the balance of the spindle, the pins of the joints on the motor side, the axial bearings of the intermediate shaft and of the submotor, and possibly other, indirectly affected parts from damage and to protect the motors from axial displacement when axial overload occurs on the spindle section 6 acting in the direction toward the side where the fixed bearing 2 is installed, this spindle section 6, along with the movable bearing 8, the antirotation device 4, 5, 10, 11, 12, and the internally toothed rotating-and-sliding sleeve 3, is able to slide over the externally toothed part of the spindle section 1. The sliding distance is limited by the distance, which can be predetermined, between the two facing ends of the spindle sections. The initiating force of the axial displacement is set by adjusting the pressure in the cylinders 7, 7'. When a maximum pressure is exceeded, the cylinders collapse and allow the one spindle section to slide over the other. The cylinders 7, 7' also provide the possibility of active control or damping. The movable bearing point 8 slides along the plates 9

When a torque overload occurs, the spindle section 6 with the permanently seated sleeve 4 slips relative to the rotating-and-sliding sleeve 3 and the pressure sleeve 5. In the process, the shear collar 10, which is permanently connected to the spindle section 6, shears off the head of the shear valve 11, so that the connection pretensioned by the pressure medium is released. After the release, rotation occurs by way of the bearing 12. The initiating torque is set by adjusting the pressure in the pressure sleeve.

The invention claimed is:

1. Overload safety coupling, which bridges a first, toothed spindle section (1) and a second spindle section (6), comprising:
   a rotating-and-sliding sleeve (3), which has internal toothing at a first end to hold the first spindle section (1) in a way that allows axial displacement;
   an inner sleeve (4) permanently seated on the second spindle section (6), the inner sleeve (4) being held at a second end of the sleeve (3) in a rear sleeve-like extension (13); and
   a pressure sleeve (5) and a fluid pressurized gap (14) pretensioned to produce a nonrotatable connection between the rear sleeve-like extension (13) and the inner sleeve (4), which frictional connection gives way in the event of an overload.

2. Safety coupling according to claim 1, wherein, to absorb the axial coupling forces, external axial pressure cylinders (7, 7') are preferably provided as spacers between the spindle sections (1 and 6).

3. Safety coupling according to claim 1, wherein the first spindle section (1) is designed with a fixed bearing (2), whereas the second spindle section (6) is designed with a movable bearing (8).

4. Safety coupling according to claim 2, wherein the initiating force of the axial displacement can be set by adjusting the pressure in the cylinders (7, 7').

5. Safety coupling according to claim 2, wherein the cylinders (7, 7') are designed to control or damp the coupling action.

6. Safety coupling according to claim 3, wherein, in the event of an axial overload on the second spindle section (6) acting in the direction toward the side where the fixed bearing (2) is installed, the second spindle section (6), along with the movable bearing (8), the nonrotatable connection (4, 5, 10, 11, 12), and the internally toothed rotating-and-sliding sleeve (3), is able to slide over an externally toothed part of the first spindle section (1).

7. Safety coupling according to claim 1, wherein, in the event of a torque overload, the second spindle section (6) with the permanently connected sleeve (4) is designed to slip relative to the rotating-and-sliding sleeve (3) and the pressure sleeve (5), and a shear collar (10), which is permanently connected to the second spindle section (6), is also in contact with a shear valve (11), so that the connection pretensioned by the pressure medium in the pressure gap (14) is released when the shear collar (10) shears off the shear valve (11).

8. Safety coupling according to claim 1, wherein the pressure sleeve (5) is rotatably supported on the inner sleeve (4) by a bearing (12).

9. Safety coupling according to claim 1, wherein a predetermined initiating torque can be set by adjusting the pressure at the pressure sleeve (5).

* * * * *